United States Patent [19]

Hyfantis, Jr. et al.

[11] Patent Number: 4,781,057
[45] Date of Patent: Nov. 1, 1988

[54] METHOD AND APPARATUS FOR DETECTING LEAKS IN A LIQUID-CONTAINING TANK

[76] Inventors: George J. Hyfantis, Jr., 346 Fallen Oak Cir., Seymour, Tenn. 37865; Richard A. Ellis, 1913 Red Fox La., Hixson, Tenn. 37343; Reg W. McCulloch, 321 W. Heritage Dr., Farragut, Tenn. 37922

[21] Appl. No.: 4,117
[22] Filed: Jan. 16, 1987
[51] Int. Cl.⁴ .............................................. G01M 3/26
[52] U.S. Cl. ....................................... 73/49.2; 73/295
[58] Field of Search ....................... 73/49.2, 49.3, 295; 374/4, 54, 181

[56] References Cited

U.S. PATENT DOCUMENTS

| Re. 31,884 | 5/1985 | Hansel et al. | 73/49.2 |
|---|---|---|---|
| 3,360,999 | 1/1968 | Greene et al. | 73/295 |
| 3,460,386 | 8/1969 | Guignard | 73/299 |
| 3,580,055 | 5/1971 | White | 73/49.2 |
| 3,653,262 | 4/1972 | Ehrenfried et al. | 73/292 |
| 3,841,146 | 10/1974 | Cross | 73/49.2 |
| 3,889,523 | 6/1975 | Nolte | 73/49.2 |
| 4,186,591 | 2/1980 | Mooney | 73/49.2 |
| 4,362,403 | 12/1982 | Mooney | 374/4 |
| 4,386,525 | 6/1983 | Mooney | 73/49.2 |
| 4,453,400 | 6/1984 | Senese et al. | 73/49.2 |
| 4,603,580 | 8/1986 | Waring | 73/295 |
| 4,624,582 | 11/1986 | Banda et al. | 374/181 |
| 4,640,127 | 2/1987 | Schneider | 73/295 |
| 4,646,560 | 3/1987 | Maresca, Jr. et al. | 73/49.2 |
| 4,679,425 | 7/1987 | Bolland | 73/49.2 |

FOREIGN PATENT DOCUMENTS

| 276474 | 10/1970 | U.S.S.R. | 73/49.2 |
|---|---|---|---|
| 673858 | 7/1979 | U.S.S.R. | 73/295 |

Primary Examiner—Tom Noland
Assistant Examiner—Hezron E. Williams
Attorney, Agent, or Firm—Luedeka, Hodges & Neely

[57] ABSTRACT

A method and apparatus are disclosed for detecting leaks in a liquid-containing tank. The method and apparatus employ an internal reference cell immersed in the liquid in the tank which contains a volume of the liquid isolated from flow communication with the liquid in the tank while having a surface which is exposed to the ambient conditions above the surface of the liquid in the tank. The level of the fluid in the tank and in the reference cell are monitored over a period of time. Level changes in the tank which do not correspond to level changes due to the temperature and evaporative effects observed in the reference cell are indicative of a leak in the tank.

3 Claims, 5 Drawing Sheets

METHOD AND APPARATUS FOR DETECTING LEAKS IN A LIQUID-CONTAINING TANK

The present invention relates to the testing of liquid-containing tanks and more particularly relates to a method and apparatus for detecting leaks in a liquid-containing tank to prevent loss of the liquid and/or the resulting environmental damage.

There are numerous types of liquid-containing tanks for which it is difficult to directly determine whether liquid is leaking from the tank. Exemplary of such tanks are underground fuel storage tanks which contain a large volume of liquid fuel such as gasoline or diesel fuel. Since visual inspection of the exterior of the tank for leaks is impossible without excavation, changes in liquid level is usually the criterion for leak determination. While the temperature changes in an underground tank are not great, even small temperature changes in a liquid such as gasoline which has a high thermal expansion coefficient make it difficult to detect a leak by simply measuring a change in liquid level. Furthermore, with volatile liquids such as gasoline, evaporative losses also affect fluid level significantly. Since ground water contamination from underground tanks has been recognized as a significant problem, routine testing and early detection of leaks is necessary to avoid continued environmental damage.

Various techniques have been devised to detect leaks in underground storage tanks. Most of such techniques observe both changes in liquid level and temperature variations and calculations are performed to account for level changes due to temperature. Because of temperature statification within the tank, accurate temperature measurements require the measurement of the temperature at a number of levels in the liquid or the circulation of the liquid in the tank to make the temperature uniform. Also with such techniques, it typically is necessary to fill the tank up into the tank filler neck or even establish a head above the full tank level. Such drastic changes in fluid level before testing are usually accompanied by bulging of the tank which can also cause liquid level changes which may not reach equilibrium for a long period of time after complete filling.

Accordingly, it is an object of the present invention to provide a method and apparatus for detecting leaks in a tank which compensates for temperature and evaporative effects. It is another object of the present invention to provide a method and apparatus which provides effective leak detection without the need for the complete filling of the tank.

These and other objects and the advantages of the present invention may be understood and appreciated when the following detailed description is read in conjunction with the accompanying drawings in which:

Generally, apparatus for detecting leaks in a liquid-containing tank according to the present invention includes means for monitoring the level of the surface of the liquid in the tank over a period of time. Apparatus of the invention further includes an internal reference cell for being immersed in the liquid and for containing a volume of the liquid isolated from flow communication with the liquid in the tank while exposing the surface of the liquid in the cell to ambient conditions above the surface of the liquid in the tank. Means are provided for monitoring the level of fluid in the reference cell over a period of time. Support structure supports the reference cell in a stationary position immersed in the fluid in the tank with the surface level of the fluid in the reference cell being at substantially the same level as the level of fluid in the tank.

In accordance with a preferred form of the apparatus of the invention, the liquid level is measured using a level sensing probe including heat transfer sensing means which produces a signal corresponding to the level of the liquid in the tank.

In accordance with the method of the invention, a volume, of the tank fluid is isolated from flow communication from the fluid in the tank such as by employing a reference cell as in apparatus according to the invention. The surface of the isolated volume of liquid is exposed to ambient conditions above the surface of the liquid in the tank and is maintained in thermal contact with and approximately at the same level as the liquid level in the tank. Both the level in the tank and the level of liquid in the reference cell are measured over a period of time.

Changes in fluid level in the reference cell are primarily due to temperature and evaporative effects which correspond to temperature and evaporative effects which change the fluid level in the tank. Accordingly, leaks are indicated by non-corresponding level changes observed in the tank.

Figure 1:
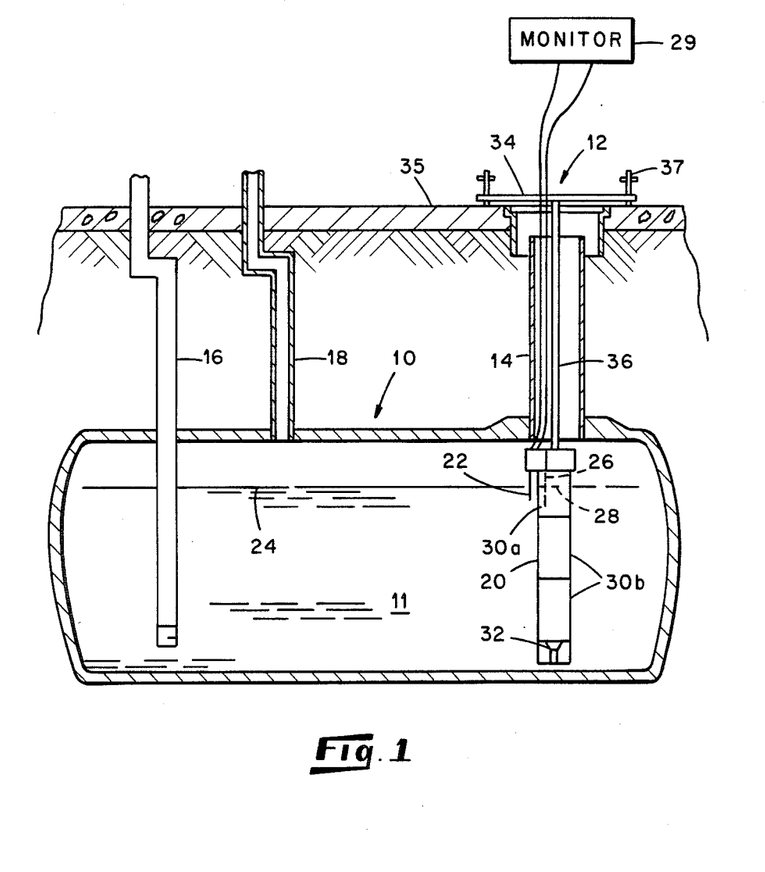
FIG. 1 is a somewhat diagrammatical crosssectional view of an underground fuel storage tank including apparatus according to the present invention installed in the filler neck of the tank.

Referring now to the drawings in which like reference characters designate like or corresponding parts throughout the several views, there is shown FIG. 1 an underground storage tank 10 containing liquid 11 such as gasoline in which leak detection apparatus 12 according to the present invention has been installed. The tank 10 has a fill pipe 14 for use in filling the tank 10 and which is used to provide access for the apparatus 12. The tank also includes a suction pipe 16 for withdrawing fluid from the tank 10 by means of a pump (not shown) and vent 18 for venting vapors from the space above the liquid in the tank and for allowing air to enter the tank as liquid is pumped from the tank.

The leak detection apparatus 10 includes a reference cell 20 which is immersed in the liquid at a stationary position and contains a volume of liquid isolated from the tank liquid 11. Also included is a tank liquid level probe 22 mounted at a stationary position which measures the tank liquid level 24. A reference liquid level probe 26 measures the liquid level 28 in the reference cell 20. Both probes 22 and 26 are connected to a monitor 29. In the embodiment depicted, the reference cell extends substantially the depth of the liquid 11 in the tank 10 and includes a plurality of reference cell sections 30a and 30b interconnected to provide a reference cell 20 of the appropriate length for the tank being tested. A fill valve 32 is provided at the bottom of the reference cell which can be opened and closed from a remote location to allow fluid from the tank to enter the reference cell 20 and fill to a level approximately equal to the level in the tank.

In order for the apparatus 12 to be supported in the tank, apparatus 12 includes a support plate 34 which is supported by the ground surface 35 around the fill pipe 14. A support pipe 36 is connected to the support plate 34 and extends downwardly and perpendicular to the plate 34 into the tank to support the apparatus 12. To compensate for a non-horizontal ground surface, leveling screws 37 are provided to level the plate 34.

Figure 2:
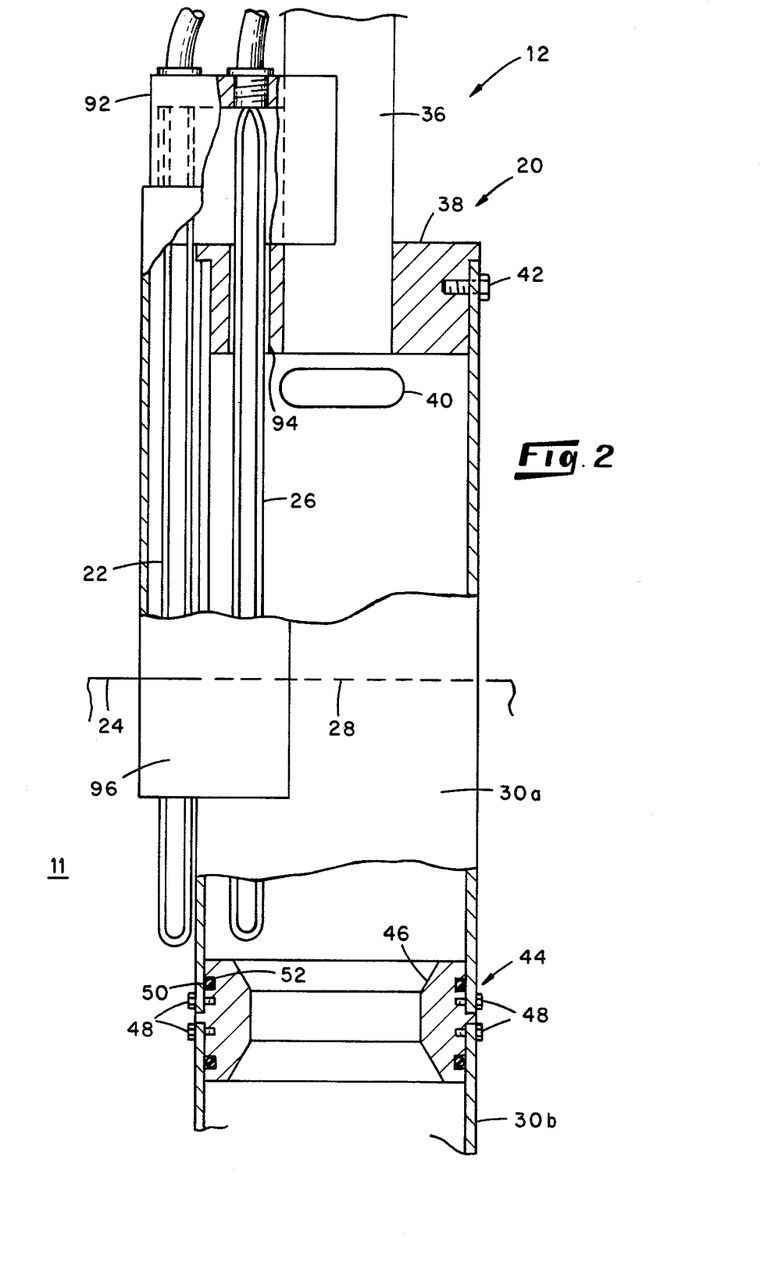
FIG. 2 is a detailed view shown partially in cross-section of an upper portion of a reference cell included in the apparatus of FIG. 1.
Figure 3:
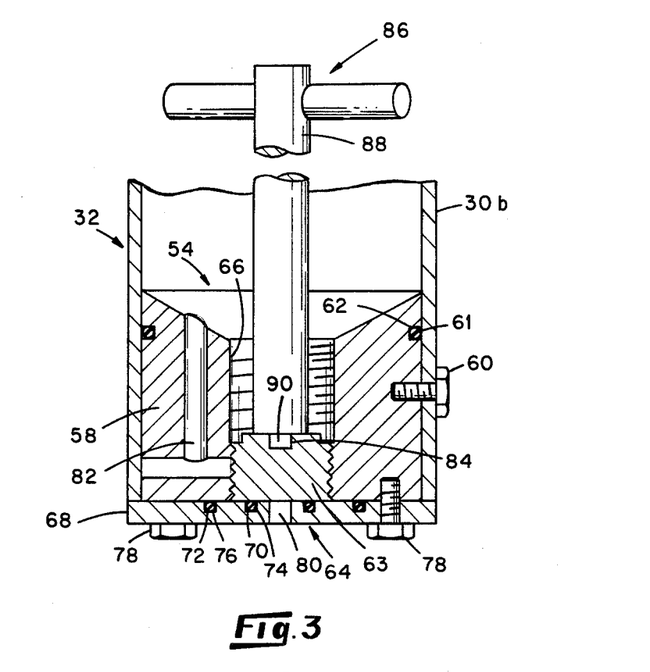
FIG. 3 is a detailed view of a lower portion of reference cell of the apparatus of FIG. 1.

Referring now to FIGS. 2 and 3, a preferred embodiment of apparatus according to the present invention is shown in which the reference cell 20 and tank liquid level probe 22 are connected together to form a single unit. The reference cell 20 is suitably provided by reference cell sections 30a and 30b which are cylindrical in shape and fabricated from a suitable material such as 2½ inch tubing. The reference cell is connected to support pipe 36 by means of reference cell cap 38 into which the support pipe 36 is threadably fitted. The reference cell cap 38 is connected to the uppermost reference cell section 30a by being dimensioned to insert within the tubing and being attached with appropriate fasteners such as one or more bolts 42 as illustrated. The uppermost reference cell section 30a is provided with one or more openings adjacent the reference cell cap 38 so that the interior of the reference cell 20 is exposed to ambient conditions in the tank 10 above the liquid 11. Lower reference cell sections 30b are connected together and are attached to the first reference cell section 30a to achieve the desired reference cell length. Preferably, the reference cell 20 is sufficiently long to extend substantially entirely the depth of the liquid 11 in the tank. Lower reference cell sections 3b are connected together and to the uppermost section 3a downwardly by coupling rings 44 which provide a sealing connection between reference cell sections 30. The coupling ring 44 shown in FIG. 2 includes a coupling ring body 46 which inserts between reference cell sections 30 and is connected to each adjacent section by bolts 48 or by other such means. An o-ring 50 and o-ring groove 52 in the body 46 of the coupling ring is provided so that the o-ring 50 contacts the interior of each of the sections to provide a sealing connection. The body 46 of the coupling rings 44 provides an essentially open path for fluid so that the reference cell has an interior volume comprised of the interconnected sections 3a and 30b.

In order for the interior of the reference cell 20 to be isolated at the bottom of the cell 20 from the liquid in the tank 10, the fill valve 32 is employed in the lower reference cell section 3b at the lower end of the reference cell 20. As shown in the preferred embodiment illustrated in FIG. 3, the fill valve 32 is provided by valve assembly 54 which includes a valve body 58 matingly fitted within the end of the lowermost reference cell section 3b and attached by one or more bolts 60 or by other such means. An o-ring 61 and o-ring groove 62 for containing the o-ring is provided at the periphery of the valve body 58 to provide a seal between the valve body and the lower section 30b. The valve assembly 54 also includes a valve plug 63 which contacts a valve seat 64 and which is movable between open and closed positions to permit fluid flow into the reference cell 20. The valve plug 63 is preferably threaded and is fitted into a threaded bore 66 in the valve body 58. The valve seat 64 is suitably provided by valve seat plate 68 which is provided with concentric angular grooves 70 and 72, respectively, containing o-rings 74 and 76 respectively, which provide a seal to the valve plug 62 and bottom of the valve body 58, respectively. The valve seat plate 68 is secured to the valve body 58 with bolts 78 or by other such means. A central opening 80 is provided in the center of the valve seat plate 68 to allow fluid to flow into the threaded bore 66 when the valve plug 62 is not in contact with o-ring 74. A passageway 82 is provided in the valve body 58 to enable fluid which flows into the threaded bore 66 to flow into the interior of the reference cell 20.

In the embodiment shown, the valve plug 63 is provided with a slot 84 on its upper surface to facilitate opening the valve. The valve is opened from a remote location by means of valve tool 86 having a shaft 88 of sufficient length to extend from above ground level through the support pipe 36 into the reference cell to the slot 84 in the valve plug 62. Valve tool 86 is provided with a mating protrusion 90 for inserting into the slot 84 to enable turning of the valve plug to open and close the valve.

Referring again to FIG. 2, the preferred apparatus 12 includes a probe holder 92 which is attached to the reference cell cap 38 by bolts (not shown) or other such means and supports both the tank liquid level probe 22 and the reference liquid level probe 26. The probe holder 92 is attached to the reference cell cap 38 off-center from the support pipe 36 and supports the reference liquid level probe 26 so that it inserts into the interior of the reference cell 20 through an opening 94 in the reference cell cap 38. Similarly, the probe holder 92 supports the tank liquid level probe 22 at a position outside and adjacent to the exterior of the reference cell 20. The probes, the probe holder, and uppermost reference cell section 30a are preferably dimensioned so that the probes do not extend downwardly past the first reference cell section 40 which facilitates assembly of the sections 30a and 30b and lessens the chance of damage to the level probes 22 and 26. In order to decrease minor fluctuations in the liquid level at the tank liquid level probe 22, a shield 96 is attached to the probe holder 92 and to the reference cell cap 38 such as by soldering or other such means which shields the upper portion of the tank liquid level probe 22 in the area where the fluid level is measured while freely permitting entry of fluid from below into the shielded area.

The reference cell is fabricated to be sufficiently thermally conductive so that the liquid in the reference cell reaches approximately the same temperatures as the liquid in the tank sufficiently fast for level changes inside and outside the cell to generally correspond and thereby detect the minimum leak volume required for the particular application. For use in testing tanks containing flammable liquids such as gasoline, it is preferable for the entire apparatus 12 to be constructed of a thermally conductive metal such as copper, brass, or other such material which does not easily produce a spark upon abrasive contact with tank, fill pipe or ground surface adjacent the tank.

Tank and reference liquid level probes 22 and 26 are probes which are sufficiently accurate for measuring level changes which correspond to the minimum acceptable leak volume in the tank being tested. In the preferred form of the invention, the probes 22 and 26 sense heat transfer and produce a signal corresponding to the liquid level. Most preferably, the probes employed provide compensation for environmental changes in temperature of the liquid and the atmosphere above the liquid in the tank to provide accurate level change measurements. Alternately, instead of employing probes which provide temperature compensation, it will be understood that heat transfer sensing probes in the tank and the reference cell can be monitored to indicate relative changes between the tank and reference cell level provided that the reference cell is construced such that temperature changes in the reference cell closely follow changes in the tank.

Figure 4:
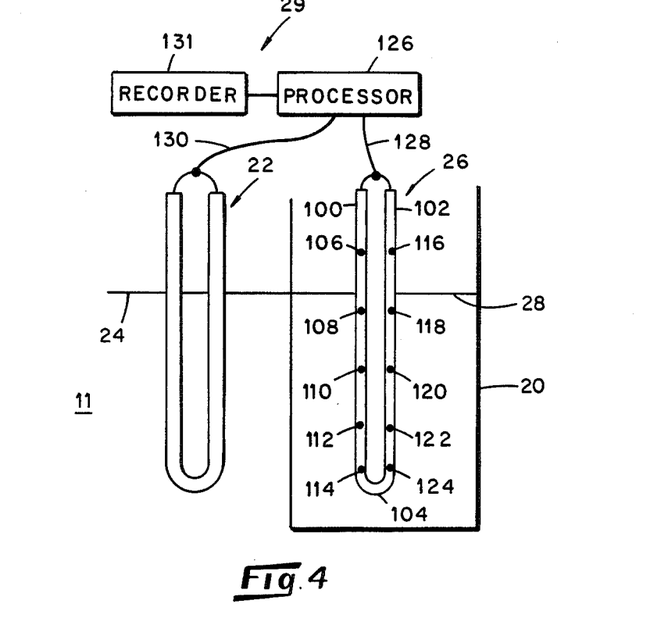
FIG. 4 is a diagrammatical elevational view of level sensing probes employed in a preferred form of apparatus according to the present invention.

FIG. 4 illustrates diagrammatically a preferred probe system employed in apparatus according to the invention. The liquid level probe 22 is shown immersed in liquid 11 with the liquid level 24 at an intermediate position along the probe 22. The reference liquid level probe 26 is shown similarly immersed in the liquid in the reference cell 20. Since the probes 22 and 26 are essentially identical in the preferred embodiment illustrated, the following describes the reference cell probe 26 in detail and the tank level probe will be understood to be essentially identical.

The probe 26 has an elongate U-shaped configuration formed by a first leg 100, a second leg 102 and a connecting segment 104 that connects the bottom ends of the two legs 102 and 104. Heated sensors 106, 108, 110, 112, and 114 are disposed within the first leg 100 which also houses a heat source ( not shown in FIG. 4), and non-heated sensors 116, 118, 120, 122, and 124 are disposed within the second leg 102. The terms "heated" and "non-heated" are not meant to imply that the sensor 100–124 are different in kind or type, but these terms are used to indicate the proximity of sensors to a heat source.

The monitor 29 is connected to the sensors 106–124 by electrical connections which produce a signal or signals indicating the temperatures of the sensors 106–124. The monitor 29 preferably includes a signal processor 126 such as analog to digital converters and a computer to monitor the sensors 106–124. Alternatively, the processor may be as simple as a voltmeter. In one embodiment, the monitor 29 outputs a single signal for probe 26 having an amplitude indicating the temperatures of the sensors 106–124 and thus indicating the liquid level. The processor 126 is similarly connected to the tank level probe 22 by electrical connection 130 and similarly monitors the level probe 22. In the preferred embodiment, a recorder 131 records values for the signals received from the processor which correspond to the liquid level at the probes 22 and 26. A suitable recorder is, for example, a dual-pen recorder which produces a record of level changes over time so that level changes in the tank and reference cell can be compared.

In the embodiment depicted, the sensors 116–124 in the second leg 22 of the probe 12 constitute reference sensors for the sensors 106–114 in the first leg 100 of the probe 26. Each sensor 116–124 in the second leg 102 is a reference sensor for the particular sensor in the first leg 100 that is summetrically across from it. Sensors 106 and 116 are corresponding sensors which means that sensor 106 is a reference sensor for sensor 106. Likewise, sensors 108 and 118, sensors 110 and 120, sensors 112 and 122, and sensors 114 and 124 are corresponding sensors.

Figures 5, 6:
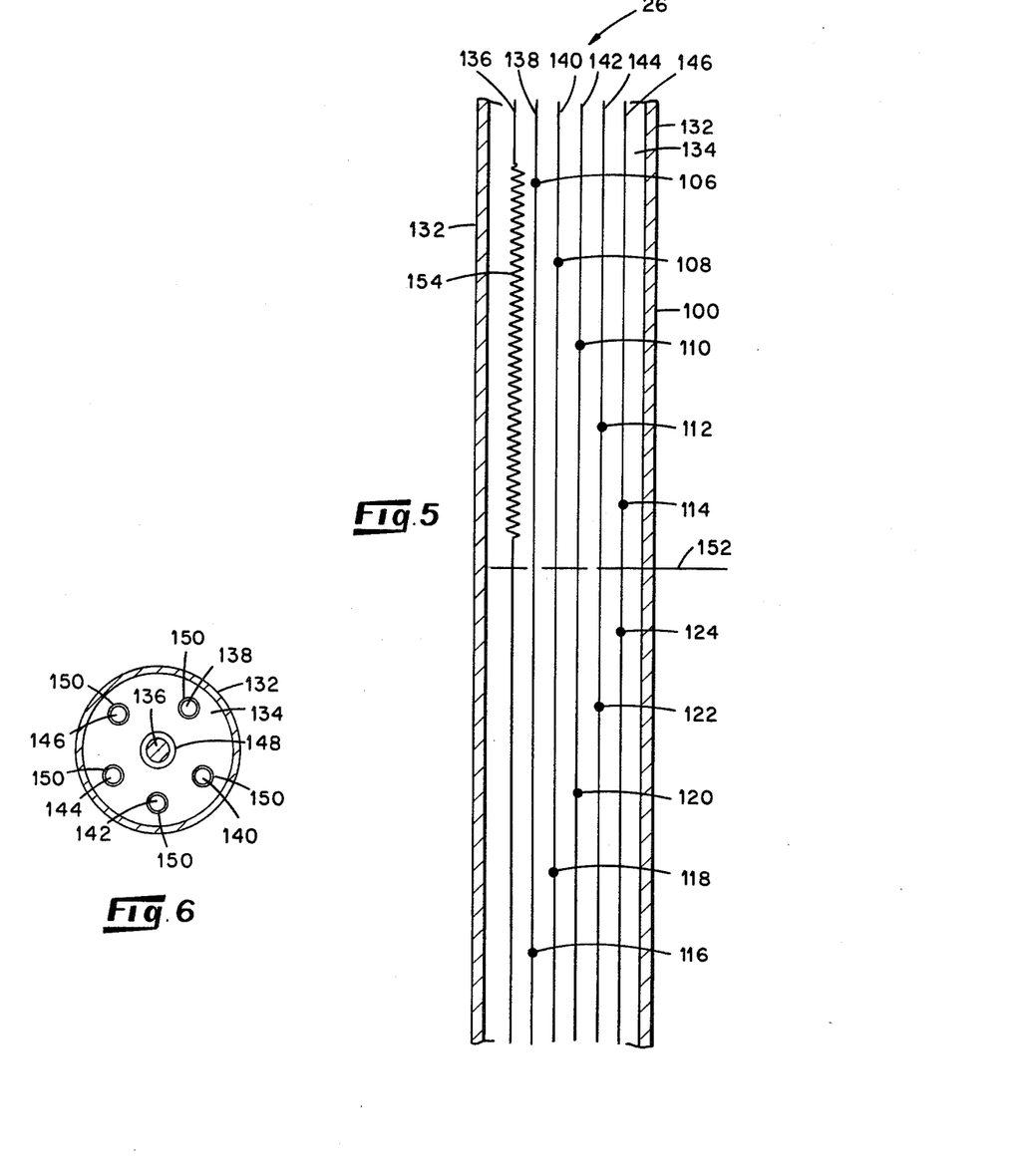
FIG. 5 is a diagrammatical view of a straight sheath with sensor wires used to manufacture the probes of FIG. 4.
FIG. 6 is a cross-sectional view of one leg of a probe as shown in of FIG. 4.

The construction of the probes 22 and 26 and the circuitry thereof may be better understood by reference to FIG. 5 which is a diagrammatical view of the probe 26 under construction. A straight tubular metallic sheath 132, preferably constructed of stainless steel, and a straight cylindrical electrical insulator 134, preferably alumina, are used to construct the probe. The probe 22 also includes a heater circuit 136 and five sensor wires, 138, 140, 142, 144 and 146. The sensor wires 138–146 shown in FIG. 5 are shown diagrammatically and do not correspond to the actual physical positions of the wires 138–146. The actual physical positioning of these wires is shown in FIG. 6. In this view, it will be appreciated that the sheath 132 and the insulator 134 are cylindrical in shape. A passageway 148 is formed in the center and extends the length of the insulator 134. This central passageway 148 is dimensioned to contain the heater circuit 136. A plurality of sensor passageways 150 are also formed in the insulator 136 extending through the length thereof. The passageways 150 are equidistantly spaced from the passageway 148 and are equidistantly spaced from adjacent passageways 150 around the approximate perimeter of the insulator 134. The sensor wires 138–146 are disposed within the passageways 150 and, thus, are equidistantly spaced from the heater circuit 136. Although this structure is preferred it is understood that the heater circuit 136 need not be positioned in the center passageway 148 and the sensor wires are not required to be equidistantly spaced from the heater circuit 136 for many applications.

Referring to FIGS. 5 and 6, the construction of the probe 26 may be understood. The first step of construction is to insert the heater circuit 136 and the sensor wires 138–146 into the insulator 134 in the positions previously described. Next, the insulator 134 is inserted into the stainless steel sheath 132, and the sheath and insulator are reduced in diameter (such as by swaging) to compress the probe 26 radially inwardly. This swaging crushes the alumina of the insulator 134 so that there is little or no spacing between the sheath 132 and the insulator 134 or between the insulator 134 and the wires 138–146 and circuit 136. The spacing as shown in FIG. 6 is primarily for purposes of clarity and does not indicate that the final probe will have spacing between the wires 138–146 and the passages 150 or between passage 148 and circuit 136. After the initial swaging, the sheath 134 is preferably annealed and swaged again. The annealing and swaging steps are continued until the diameter of the sheath 132 is reduced by a factor of about twenty-five percent. After the steps of swaging, annealing, and drawing are completed, the sheath 132 is again annealed in the area of its midregion indicated by line 152 in FIG. 5 and is formed or bent into a "U" about the midregion line 152 to form the U-shaped probe that is shown in FIG. 4.

Referring to FIG. 5, it is shown that the heater circuit 136 includes a heater cable segment 154 that is disposed only above the midregion line 152. When the sheath 132 is bent into the U-shape, the upper half of the sheath 132 forms the first leg 100 of the probe 26, and the lower half of the sheath 132 forms the second leg 102.

The heated sensors 106–114 and the non-heated sensors 116–124 are positioned in the sheath 132 so that when it is bent around its midregion line 152, the heated and nonheated sensors will be aligned symmetrically across, one from the other, as shown generally in FIG. 4. Thus, when the sensor wires 138–146 are inserted into the insulator 132, they are positioned such that the two sensors on each wire are generally equidistantly spaced from the midregion line 152. Thus, sensors 106 and 116, 108 and 118, 110 and 120, 112 and 122 and 114 and 124 are generally equidistantly spaced from midregion line 152.

Figure 7:
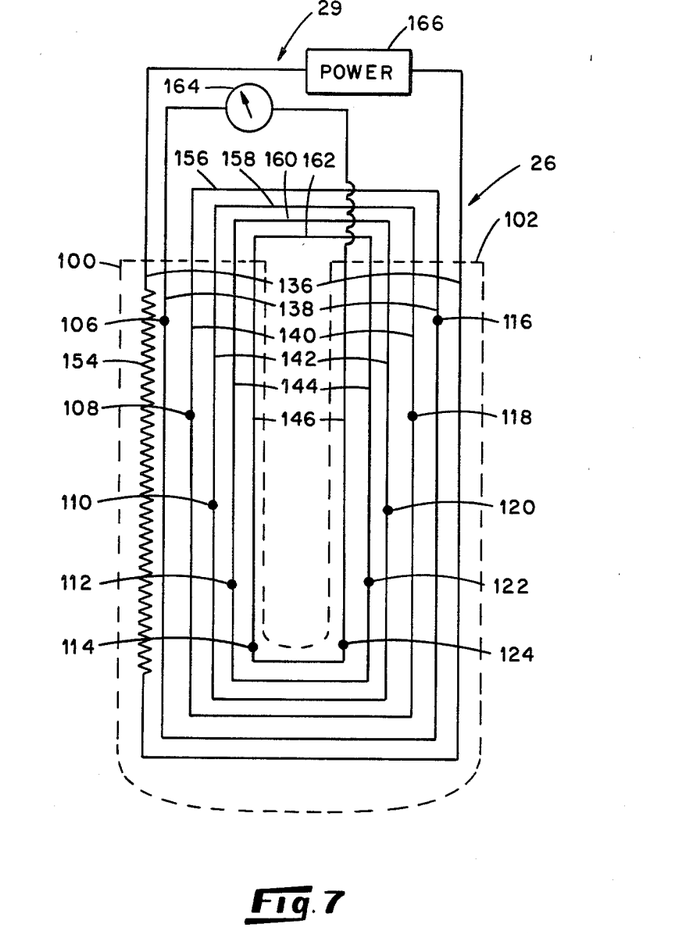
FIG. 7 is a detailed diagrammatical view of one of the probes shown in FIG. 4 with one embodiment of a monitor.

Referring now to FIG. 7, a circuit diagram is shown of probe 26 in a preferred configuration. In FIG. 7, sensor wires 138-146 are connected in series by electrical connections 156, 158, 160 and 162 that extend from the top of the first leg 100 to the top of the first leg 102. Connector 156 is connected from the trailing end of wire 138 which is located in the second leg 102 to the leading end of wire 140 which is positioned in the first leg 100. Likewise, the trailing end of wire 140 is connected to the leading end of wire 142 by connector 158; the trailing end of wire 142 is connected to the leading end of wire 144 by connector 160; and the trailing end of wire 144 is connected to the leading end of wire 146 by connector 162. The leading end of wire 138 and the trailing end of wire 146 are connected to a volt meter 164, and a power source 166 is connected across wire 136.

In this construction, the sensor wires 138-146 are connected in series so that the voltage appearing on a voltmeter 164 is the sum of the voltages produced by each of the sensor wires 138-146. In this embodiment, the sensors 106-124 are thermocouple junctions formed by constructing the wires alternately of alumel and chromel or other suitable thermo-electric materials. These portions of the wires 138-146 that are above the thermocouple junctions 106-124 are constructed of alumel, and those portions that are below the thermocouple junctions 106-124 are constructed of chromel. Thus, it will be appreciated that the voltage potential produced by the thermocouple pairs 106 and 116, 108 and 118, 110 and 120, 112 and 122, and 114 and 124 are additive and the junctions 106-124 in leg 100 are opposite in polarity to the junctions 116-124 in leg 102. Since the reference junctions 116-124 are at the same vertical level as the heated junctions 106-114, the reference junctions 116-124 will provide a correction factor or a temperature reference for environmental temperatures. If the temperature of the environment of the entire probe 26 should rise, for example, this rise in temperature would affect the first leg 100 and the second leg 102 equally. The effect on junctions 106-114 would be the same as the effect on junctions 116-124. Thus, the relative temperature difference appearing at the junctions 106-114 compared to junctions 116-124 should remain the same. Under such circumstances, changes in environmental temperature should not affect the output appearing at meter 164.

The system shown in FIG. 7 includes a power supply 166 which heats the heater cable segment 154 and thereby heating the thermocouple junctions 106-114. Because of the increased temperature of junctions 106-114 relative to junctions 116-124, an increased voltage appears at the volt meter 164. Assuming for example that each of the thermocouple junction pairs produces a voltage of 0.1 volts, the total output appearing on meter 84 would be 0.5 volts. If the probe 92 is inserted into a cooling liquid that covers junctions 112, 114, 122 and 124, the heating effect of the heater cable segment 154 will be negated with respect to junctions 112 and 114. Thus, junctions 112 and 114 would be cooled to a temperature that approximates the temperature of junctions 122 and 124, and the junction pairs 112 and 122, and 114 and 124, will not produce an appreciable voltage. In such case, the voltage appearing on meter 164 will drop to 0.3 volts. If the temperature of the liquid covering junctions 112, 114, 122 and 124 increases or decreases, it should have no appreciable affect on the operation of the probe 22 since the environmental temperatures effecting junctions 112 and 114 are the same as those affecting junctions 122 and 124.

The probe 26 is constructed to provide a continuous electrical output as the liquid level 28 varies and thus continuously measures the liquid level 28 along the probe 26. This continuous output is achieved because of the axial heat flow in the probe 26 along both legs 100 and 102. The probe 22 measures the liquid level 24 in the tank similarly. The spacing between the sensors 106-114 and 116-124 is chosen with reference to the diameters of the legs 100 and 102 (which are normally the same), the power supplied to the heater 154, and the heat transfer properties of the materials used in probe 22. In the preferred embodiment, these factors are adjusted so that the electrical output (voltage) measured at the meter 164 is generally linear with respect to changes in the liquid level 28. In addition, with a recorder such as a dual pen recorder, it is desirable for separate gain controls for each probe 22 and 26 to be included in the circuitry so that the output signals provided to the recorder can be adjusted to match the range of the recording device being employed.

When the preferred tank and reference cell probes 22 and 26 are to be employed in tanks containing flammable liquids such as gasoline, it is desirable for the probes 22 and 26, the monitor 29, and any power supply used in the monitor 29 to employ circuitry which is "intrinsically safe" according to National Electrical Code Standard 329.

In operation, the apparatus 12 is inserted in the fill pipe 14 or other opening in the tank 10 with the reference cell 20 being vertically immersed in the liquid 11 and extending substantially through the liquid. This is accomplished by employing a suitable length support pipe 36 and appropriate number and length of reference cell sections 30a and 30b and adjusting the leveling screws 37 to adjust the reference cell 20 to be in a generally vertical position. The first reference cell section 30a is immersed so that the level of the liquid in contact with the probes 22 and 26 is at an intermediate position on the probes such as is shown in FIG. 2. The reference cell 20 is allowed to fill with liquid by opening the valve 32 by use of opening tool 86 which is used to rotate valve plug 63. After the liquid has filled the reference cell 20 such that the level 28 in the reference cell 20 is at approximately the same level as the tank level 24, the valve 32 is closed.

After the apparatus 12 is installed in the tank, it is generally necessary to wait for the disturbance of the liquid in the tank which resulted for the installation of the apparatus to subside and to allow the temperature in the reference cell to become approximately equal to the temperature in the tank. The period of time required will of course depend on the degree of disturbance initially, the level of fluid in the tank, temperature differences in the tank, etc. In addition, with the preferred probes 22 and 26, it is necessary for power to be supplied to the heater circuit 136 for a period of time before monitoring is begun to allow the probes to equilibrate with the liquid at the approximate initial levels in the tank 10 and in the reference cell 20.

The testing is performed by monitoring the liquid level 24 in the tank 10 and by monitoring the level 28 in the reference cell 20 over a time period. Preferably, the data is recorded to facilitate comparison of fluid levels. Because the reference cell 20 is immersed in the fluid 11, temperature in the cell 20 will generally correspond to the temperature in the tank and will become somewhat temperature stratified if the tank has temperature stratification. Variations in the overall liquid temperature or in one or more stata in the tank generally correspond temperature changes in the reference cell 20. In addition, evaporation of liquid from the surface 28 of the liquid in the reference cell 20 will correspond to the evaporation occurring from the liquid in the tank. There need not be linear correlation between the level measurements observed in the cell 20 and the tank 10 provided that correspondence between observed level changes is established.

From the probe measurements, leaks in the tank are indicated from changes in fluid level in the tank which do not correspond to changes in the reference cell. The measurements observed at the tank level probe 22 may also be affected by other factors such as tank shape changes due to the tank having been filled recently, by ground water levels rising, etc. In such instances, the test period should be sufficiently long that such conditions equalize or are observed to be cyclical so that changes due to a leak can be observed if the tank is leaking.

The method and apparatus according to the present invention detect leaks in liquid containing tanks and compensate for temperature and evaporative effects. It is generally unnecessary to observe the absolute temperatures of the fluid in the tank and to perform calculations to compensate for temperature changes or evaporation. Furthermore, it is usually unnecessary to fill the tank completely. Because of the simplicity and safety of the preferred apparatus and the nature of the data obtained, the leak detection can be easily accomplished on a routine basis without the need for extensive training of personnel who perform the testing.

While a preferred embodiment of the present invention has been shown and described, it will be understood that the invention is capable of numerous rearrangements, modifications, and substitutions of parts without departing from the scope of the invention as set forth in the appended claims.

What is claimed is:

1. Apparatus for detecting leaks in a liquid-containing tank comprising:
   tank level sensing probe comprising heat transfer sensor means for sensing heat transfer along the probe for producing a signal corresponding to the level of liquid in the tank;
   thermally-conductive reference cell means for being immersed in the liquid and for containing a volume of liquid isolated from flow communication with the liquid in the tank, said volume of liquid in said reference cell means having a surface being exposed to ambient conditions above the surface of the liquid in the tank;
   support means for supporting the reference cell means in a fixed position immersed in the liquid in the tank with the surface level of the liquid in the reference cell being at approximately the same level as the level of the liquid in the tank;
   reference level sensing probe comprising heat transfer sensor means for sensing heat transfer along the probe and producing a signal corresponding to the level of the fluid in the reference cell;
   means for monitoring the signals produced by the tank level sensing probe and the reference level sensing probe over a period of time;
   wherein said tank level sensing probe and said reference level sensing probe each comprise:
   a main probe unit having first an second legs disposed in a side-by-side substantially parallel relationship;
   a heater circuit having a heater segment for heating at least said first leg of said main probe unit and being disposed in an orientation extending along said first leg;
   heated sensor means disposed proximate to said heater segment for being heated by said heater segment and for sensing temperatures at a plurality of positions along said first leg;
   non-heated sensor means for sensing temperatures at a plurality of positions along said second leg; and
   circuit means connected to said heated sensor means and said non-heated sensor means for producing a signal proportional to the temperatures sensed by said heated sensors and said second sensors.

2. The apparatus of claim 1, wherein said main probe unit comprises a tube comfigured into a U-shaped having first and second parallel upright sections and having a transverse section connecting one end of said first upright section with one end of said second upright section, said first and second parallel upright sections forming said first and second legs.

3. The apparatus of claim 1 wherein:
   said heated sensor means comprise a plurality of sensors disposed in spaced intervals along said first leg for sensing temperatures of said first leg;
   said non-heated sensor means comprise a plurality of non-heated temperature sensors disposed in said second leg at positions corresponding to the heated temperature sensors in said first leg, a corresponding one of said non-heated temperature sensors being positioned across from each one of said heated temperature sensors in a line generally perpendicular to said first and second legs; and
   said circuit means being connected to said heated sensors and non-heated sensors to produce a signal proportional to the temperature of said heated sensors to provide environmental temperature compensation, whereby changes in the temperature of the environment proximate to the probe will not affect the signal produced by said circuit means.

* * * * *